US012756940B2

(12) United States Patent
Gong et al.

(10) Patent No.: US 12,756,940 B2
(45) Date of Patent: Oct. 6, 2026

(54) CAMERA MODULE AND INTERACTION DEVICE

(71) Applicant: TENCENT TECHNOLOGY (SHENZHEN) COMPANY LIMITED, Shenzhen (CN)

(72) Inventors: Hui Gong, Shenzhen (CN); Shiyou Sun, Shenzhen (CN); Jun Lv, Shenzhen (CN); Kai Xia, Shenzhen (CN); Weibiao Zhou, Shenzhen (CN); Yong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/233,682

(22) Filed: Jun. 10, 2025

(65) Prior Publication Data

US 2025/0310652 A1 Oct. 2, 2025

Related U.S. Application Data

(63) Continuation of application No. PCT/CN2024/091139, filed on May 6, 2024.

(30) Foreign Application Priority Data

May 15, 2023 (CN) ......................... 202321157190.9

(51) Int. Cl.
*H04N 23/74* (2023.01)
*H04N 23/11* (2023.01)
(Continued)

(52) U.S. Cl.
CPC ............. *H04N 23/74* (2023.01); *H04N 23/11* (2023.01); *H04N 23/13* (2023.01); *H04N 23/56* (2023.01); *H04N 23/72* (2023.01); *H04N 23/73* (2023.01)

(58) Field of Classification Search
None
See application file for complete search history.

(56) References Cited

U.S. PATENT DOCUMENTS

| | | | | |
|---|---|---|---|---|
| 2015/0381909 A1* | 12/2015 | Butte | ................ | A61B 1/00188 250/578.1 |
| 2023/0283373 A1* | 9/2023 | You | ...................... | H04B 10/116 398/118 |
| 2024/0015260 A1* | 1/2024 | Patton | .................... | H04N 5/268 |

FOREIGN PATENT DOCUMENTS

| | | |
|---|---|---|
| CN | 215120998 U | 12/2021 |
| CN | 219960728 U | 11/2023 |

(Continued)

OTHER PUBLICATIONS

International Search Report and Written Opinion for International Application PCT/CN2024/091139 mailed on Jul. 11, 2024, 9 pages (2 pages of General English Translation of ISR and 7 pages of Official Document).

(Continued)

*Primary Examiner* — Hung Q Dang
(74) *Attorney, Agent, or Firm* — ArentFox Schiff LLP

(57) ABSTRACT

A camera module includes an infrared sensor, a color sensor, an infrared light source, a white-light light source and a control circuit. The infrared sensor captures infrared light according to a first control signal having first strobes. The color sensor captures white light according to a third control signal having second strobes. The infrared light source provides supplemental infrared light according to the first control signal. The infrared light source is turned on or off according to the first control signal. The white-light light source provides supplemental white-light according to a second control signal that is a PWM signal. The white-light light source is turned on or off according to the second control signal. The control circuit generates the second (Continued)

control signal with at least a first rising edge of a first pulse being synchronized with a first falling edge of a first strobe in the first control signal.

20 Claims, 3 Drawing Sheets

(51) Int. Cl.

| | |
|---|---|
| ***H04N 23/13*** | (2023.01) |
| ***H04N 23/45*** | (2023.01) |
| ***H04N 23/56*** | (2023.01) |
| ***H04N 23/72*** | (2023.01) |
| ***H04N 23/73*** | (2023.01) |

(56) References Cited

FOREIGN PATENT DOCUMENTS

| | | | | | |
|---|---|---|---|---|---|
| CN | 119893296 A | * | 4/2025 | ............. H04N 23/65 |
| JP | 2020-040565 A | | 3/2020 | |
| KR | 102043156 B1 | * | 11/2019 | ........... H04N 13/239 |
| WO | 2018/079372 A1 | | 5/2018 | |

OTHER PUBLICATIONS

Office Action received for Japanese Patent Application No. 2025-523075, mailed on Mar. 3, 2026, 8 pages (4 pages of English Translation and 4 pages of Original Document).

* cited by examiner

CAMERA MODULE AND INTERACTION DEVICE

RELATED APPLICATIONS

The present application is a continuation of International Application No. PCT/CN2024/091139, filed on May 6, 2024, which claims priority to Chinese Patent Application No. 202321157190.9, filed on May 15, 2023. The entire disclosures of the prior applications are hereby incorporated by reference.

FIELD OF THE TECHNOLOGY

Embodiments of the present disclosure relate to a camera module and an interaction device.

BACKGROUND OF THE DISCLOSURE

A camera module may be applied to an identity recognition module, such as an interaction device, and is configured to collect and recognize information. When light is dark, the camera module fills light (e.g., provides supplemental light), so that the camera module can obtain a clear image.

SUMMARY

Some aspects of the disclosure provide a camera module. The camera module includes an infrared sensor, a color sensor, an infrared light source, a white-light light source, and a control circuit. The infrared sensor is configured to capture infrared light according to a first control signal having first strobes. The color sensor is configured to capture white light according to a third control signal having second strobes. The infrared light source is configured to provide supplemental infrared light according to the first control signal. The infrared light source is turned on or off according to the first control signal. The white-light light source is configured to provide supplemental white-light according to a second control signal that is a pulse width modulation (PWM) signal. The white-light light source is turned on or off according to the second control signal. The control circuit is configured to generate the second control signal with at least a first rising edge of a first pulse being synchronized with a first falling edge of a first strobe of the first strobes in the first control signal, the second control signal causes the white-light light source to turn on in response to the first rising edge when the infrared light source is turned off based on the first falling edge of the first strobe.

Some aspects of the disclosure provide a method of imaging. For example, an infrared light source is turned on/off according to a first control signal having first strobes. The infrared light source provides supplemental infrared light when the infrared light source is turned on. A white-light light source is turned on/off according to a second control signal that is a pulse width modulation (PWM) signal, the white-light light source provides supplemental white light when the white-light light source is turned on. An infrared sensor is controlled according to the first control signal. The infrared sensor captures infrared light according to the first strobes in the first control signal and is synchronized with the infrared light source according to the first control signal. A color sensor is controlled according to a third control signal having second strobes. The color sensor captures white light according to the second strobes in the third control signal. In some aspects, the second control signal is generated with at least a first rising edge of a first pulse being synchronized with a first falling edge of a first strobe of the first strobes in the first control signal. The second control signal causes the white-light light source to turn on in response to the first rising edge when the infrared light source is turned off based on the first falling edge of the first strobe.

Some aspects of the disclosure also provide non-transitory computer-readable storage medium storing instructions which when executed by at least one processor cause the at least one processor to perform the method of imaging.

At least one embodiment of the present disclosure provides a camera module. The camera module includes an infrared sensor, a color sensor, an infrared strobe light, an image processor, and a white-light strobe light. The infrared sensor is electrically connected to the color sensor, the infrared strobe light, and the image processor. The image processor is further electrically connected to the white-light strobe light. The infrared strobe light is configured to fill light for the infrared sensor. The white-light strobe light is configured to fill light for the color sensor. The infrared sensor and the color sensor are exposed in a staggered manner. The image processor is configured to control the infrared strobe light and the white-light strobe light to fill light in the staggered manner.

DESCRIPTION OF EMBODIMENTS

Figure 1:
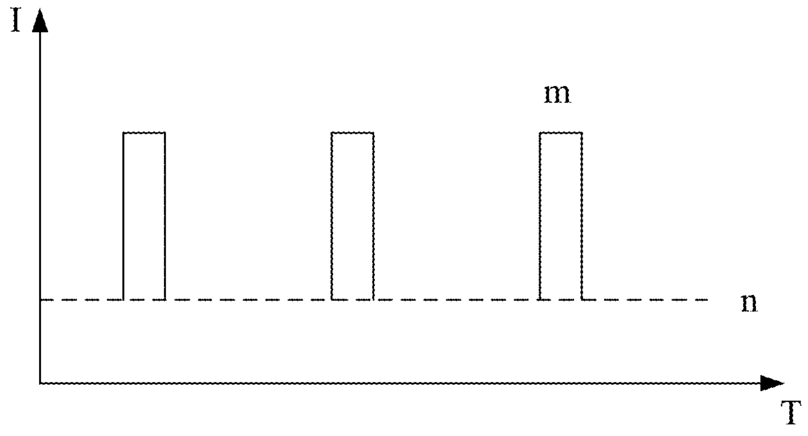
FIG. 1 is a schematic diagram of a current in a camera module according to an embodiment of the present disclosure.

The following describes technical solutions in embodiments of this disclosure with reference to the accompanying drawings. The described embodiments are some of the embodiments of this disclosure rather than all of the embodiments. Other embodiments are within the scope of this disclosure.

Some labels in the drawings are briefly introduced: 1 denotes an infrared sensor; 2 denotes a color sensor; 3 denotes an infrared strobe light; 4 denotes an image processor; 5 denotes a white-light strobe light; a denotes a first control signal; b denotes a second control signal; c denotes a frame synchronization signal; and d denotes a third control signal.

In the related art, a camera module includes an infrared sensor, a color sensor, an infrared strobe light, an image processor, and a white-light strobe light. The infrared sensor is electrically connected to the infrared strobe light. When light is dark, the infrared strobe light is in a light-filling state when the infrared sensor is exposed, so that the infrared sensor can obtain a clear black and white image. The white-light strobe light is in the light-filling state when the color sensor is exposed, so that the color sensor obtains a clear color image. Because infrared light is invisible light, the infrared strobe light is generally used in a pulse cyclic lighting mode, and human eyes do not perceive flicker of the light. White light is visible light. If the white-light strobe light is in the light-filling state only when the color sensor is exposed, human eyes are uncomfortable due to flicker of the white light. Therefore, to avoid flicker of the white light and ensure a light-filling effect, the white light is usually filled in a continuous lighting mode.

However, because the white-light strobe light in the related art is in an on state when light is dark, the white-light strobe light and the infrared strobe light are simultaneously in the light-filling state. In this case, a maximum current generated by strobe lights in the camera module is a superimposition value of a current when the white-light strobe light fills light and a current when a color strobe light fills light. As shown in FIG. 1, an abscissa is time T, and an ordinate is a current I; a solid-line figure is a current in the infrared strobe light, and m is a current value of the infrared strobe light in the light-filling state; and a dashed-line figure is a current in the white-light strobe light, and n is a current value of the white-light strobe light in the light-filling state. It can be known from FIG. 1 that, a drive current of the infrared strobe light and a drive current of the white-light strobe light are superimposed when the infrared strobe light and the white-light strobe light are simultaneously turned on. In other words, the maximum current generated by the two strobe lights is m+n. Therefore, there is a relatively high requirement for a power supply capability of an interaction device, further affecting integration and promotion of the camera module in the interaction device.

Figure 2:
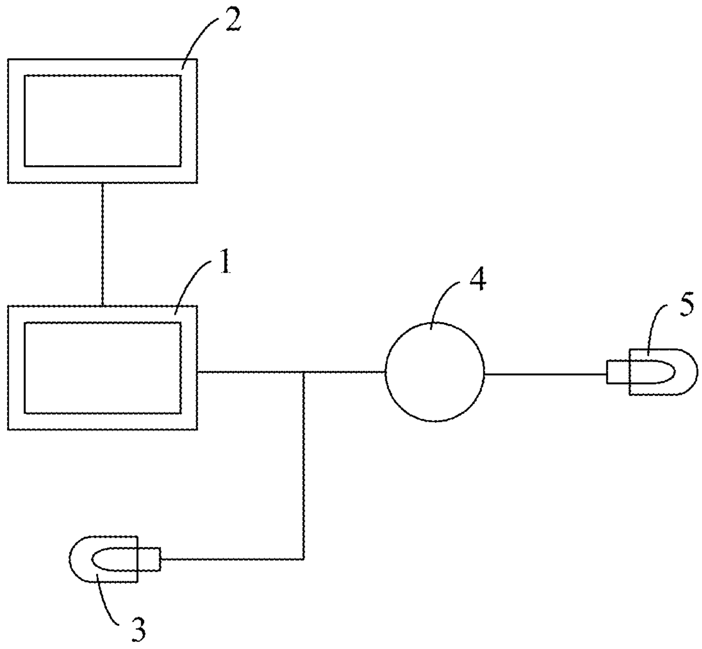
FIG. 2 is a schematic structural diagram of a camera module according to an embodiment of the present disclosure.

In view of the foregoing technical problem, as shown in FIG. 2, an embodiment of the present disclosure provides a camera module. The camera module includes an infrared sensor 1, a color sensor 2, an infrared strobe light 3 (an example of an infrared light source), an image processor 4 (an example of a control circuit), and a white-light strobe light 5 (an example of white-light light source). The infrared sensor 1 is electrically connected to the color sensor 2, the infrared strobe light 3, and the image processor 4. The image processor 4 is further electrically connected to the white-light strobe light 5. The infrared strobe light 3 is configured to fill light (provide supplemental infrared light) for the infrared sensor 1. The white-light strobe light 5 is configured to fill light (provide supplemental white-light) for the color sensor 2. The infrared sensor 1 and the color sensor 2 are exposed in a staggered manner. The image processor 4 is configured to control the infrared strobe light 3 and the white-light strobe light 5 to fill light in the staggered manner.

The infrared strobe light 3 and the white-light strobe light 5 fill light in the staggered manner. In other words, the infrared strobe light 3 and the white-light strobe light 5 are asynchronously turned on. In this way, a peak current in the camera module is a drive current of the infrared strobe light 3 or a drive current of the white-light strobe light 5, so that the peak current in the camera module is small.

The camera module provided in some aspects of the present disclosure is described in more detail below.

Figure 3:
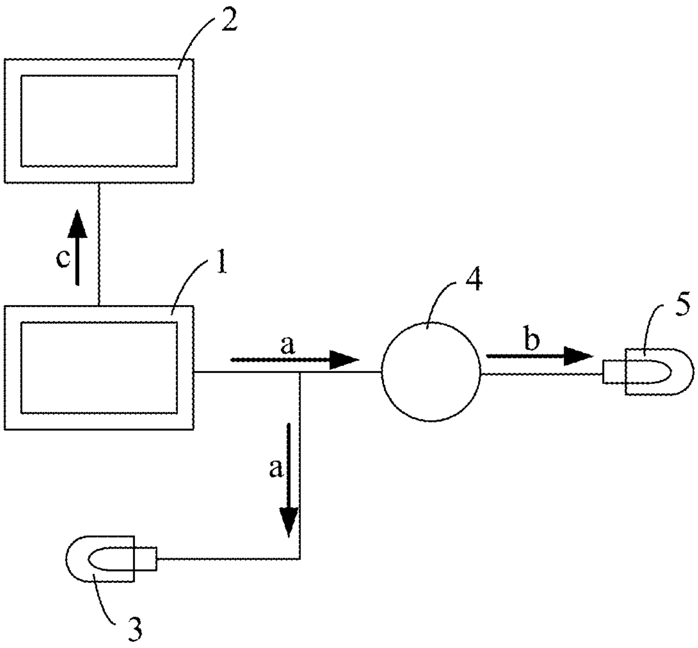
FIG. 3 is a schematic diagram of signal transmission of a camera module according to an embodiment of the present disclosure.
Figure 4:
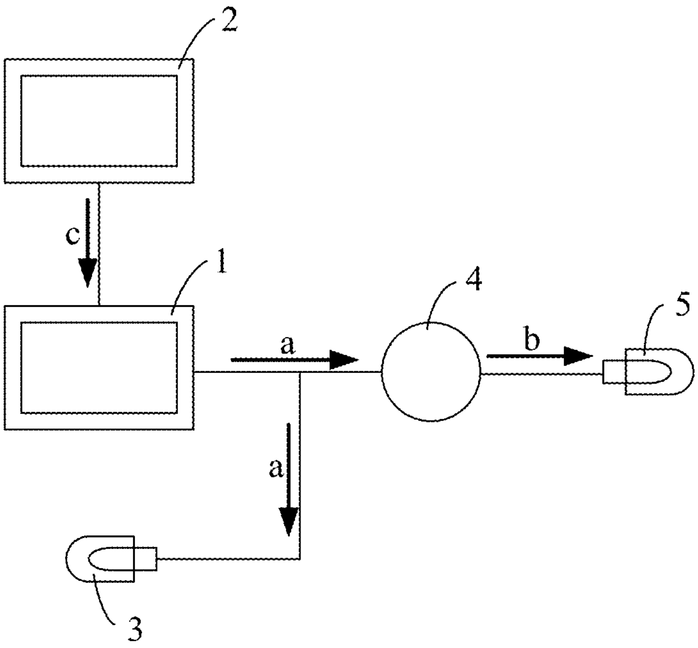
FIG. 4 is a schematic diagram of signal transmission of a camera module according to an embodiment of the present disclosure.

As shown in FIG. 2, the camera module includes the infrared sensor 1, the color sensor 2, the infrared strobe light 3, the image processor 4, and the white-light strobe light 5. The infrared sensor 1 is electrically connected to the color sensor 2, the infrared strobe light 3, and the image processor 4. The image processor 4 is further electrically connected to the white-light strobe light 5. The infrared sensor 1 and the color sensor 2 are exposed in the staggered manner. As shown in FIG. 3 and FIG. 4, the infrared sensor 1 is configured to output a first control signal a to the infrared strobe light 3 and the image processor 4. When the infrared sensor 1 is in an exposed state. the first control signal a is in a high-level state and is configured for controlling the infrared strobe light 3 to fill light. The image processor 4 is configured to convert the first control signal a into a second control signal b, and transmit the second control signal b to the white-light strobe light 5. When the color sensor 2 is in the exposed state, the second control signal b is in the high-level state and is configured for controlling the white-light strobe light 5 to fill light. The first control signal a and the second control signal b are asynchronously in the high-level state.

The camera module may be configured to scan a palm, a code, a face, or the like. Therefore, the camera module provided in this embodiment of the present disclosure may also be referred to as a palm-scanning module, a code-scanning module, a face-scanning module, or the like.

A specific type of the camera module is not limited in embodiments of the present disclosure. In some examples, the camera module is applied to a payment device. A user may scan a palm, a code, or a face by using the camera module to complete payment. In some other examples, the camera module may alternatively be applied to an access control device. A user may scan a palm, a code, a face, or the like by using the camera module to open an access control.

The infrared sensor 1 may also be referred to as an infra red (IR) camera sensor. The color sensor 2 may also be referred to as a red green blue (RGB) camera sensor. The infrared sensor 1 and the color sensor 2 are configured to collect information, for example, collect information about an information code, human face information, or palm print information. The infrared sensor 1 generates a black and white image after obtaining the foregoing information. The color sensor 2 generates a color image after obtaining the foregoing information. The camera module can obtain more comprehensive information by combining the images generated by the infrared sensor 1 and the color sensor 2, thereby facilitating rapid recognition of information.

The infrared strobe light 3 may also be referred to as an infra red light emitting diode (IR LED). The white-light strobe light 5 may also be referred to as a white-light light emitting diode (LED). The infrared strobe light 3 and the white-light strobe light 5 may be driven by a drive circuit or a power supply chip.

The image processor 4 may also be referred to as an image signal processing (ISP) chip. In some examples, the image processor 4 is implemented by a central processing unit (CPU) chip having an image processing function. After receiving the first control signal a, the image processor 4 can generate the second control signal b based on the first control signal a, and transmit the second control signal b to the white-light strobe light 5. In some examples, a non-transitory computer-readable medium stores instructions that can cause a processor (e.g., CPU) to perform a method of imaging, such as generating control signals, controlling lighting sources and sensors, and the like.

The first control signal a and the second control signal b are both pulse width modulation (PWM) waves.

According to the camera module provided in this embodiment of the present disclosure, after the infrared strobe light 3 receives the first control signal a transmitted by the infrared sensor 1, the infrared strobe light 3 is turned on when the first control signal a is in the high-level state. After the white-light strobe light 5 receives the second control signal b transmitted by the image processor 4, the white-light strobe light 5 is turned on when the second control signal b is in the high-level state. Because the first control signal a and the second control signal b are asynchronously in the high-level state, the infrared strobe light 3 and the white-light strobe light 5 are asynchronously turned on. In other words, the infrared strobe light 3 and the white-light strobe light 5 fill light in the staggered manner. Therefore, the peak current appearing in the camera module is a current of the infrared strobe light 3 in the light-filling state, or a current of the white-light strobe light 5 in the light-filling state. The currents of the two strobe lights are not superimposed. Therefore, the peak current in the camera module is small, thereby reducing a requirement for a power supply capability of an interaction device, and further facilitating integration and promotion of the camera module in the interaction device.

Figure 5:
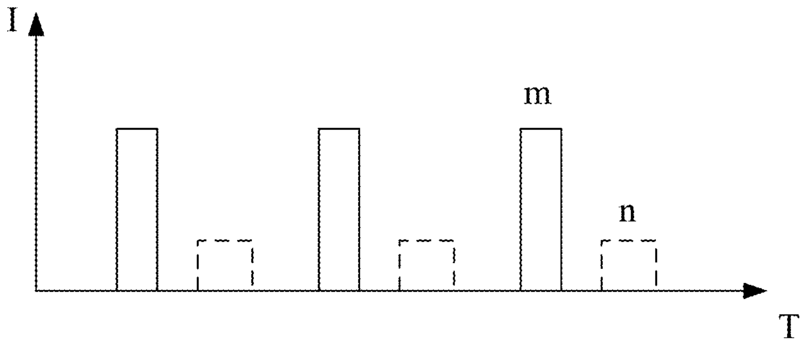
FIG. 5 is a schematic diagram of a current in a camera module according to an embodiment of the present disclosure.

For example, as shown in FIG. 5, an abscissa is time T, and an ordinate is a current I; a solid-line figure is a current in the infrared strobe light 3, and m is a current value of the infrared strobe light 3 in the light-filling state; and a dashed-line figure is a current in the white-light strobe light 5, and n is a current value of the white-light strobe light 5 in the light-filling state. Because the infrared strobe light 3 and the white-light strobe light 5 are asynchronously turned on, the current of the infrared strobe light 3 and the current of the white-light strobe light 5 are not superimposed. Therefore, a maximum current generated by the two strobe lights is m or n. In FIG. 1, m>n. Therefore, the maximum current generated by the two strobe lights is m. In other words, the peak current in the camera module is the current value of the infrared strobe light 3 in the light-filling state.

An implementation example in which the infrared strobe light 3 and the white-light strobe light 5 fill light in a staggered manner is described below.

Figure 6:
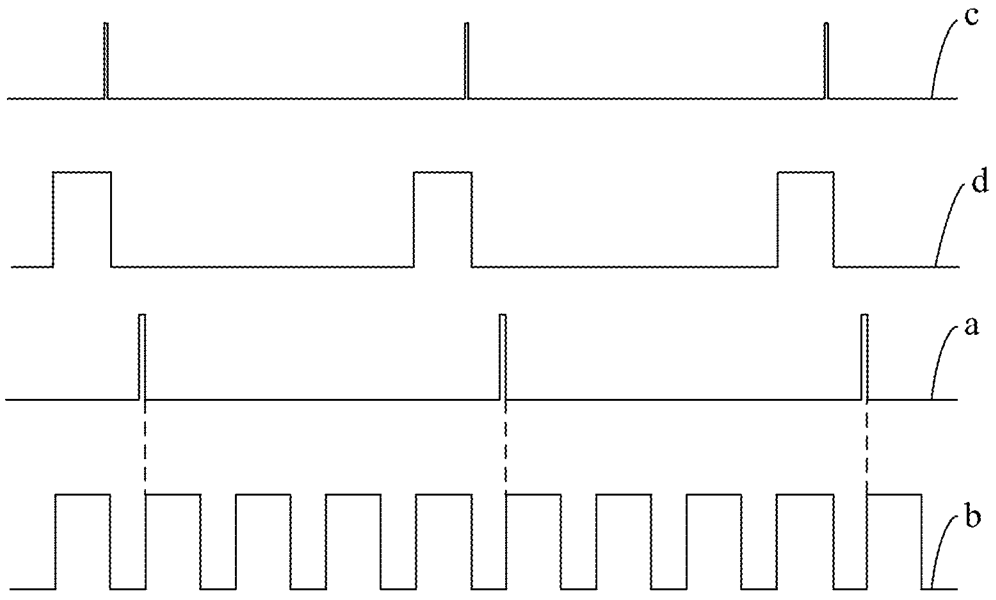
FIG. 6 is a schematic diagram of a signal of a camera module according to an embodiment of the present disclosure.

In some examples, as shown in FIG. 6, a falling edge of the first control signal a coincides with a rising edge of the second control signal b. A moment corresponding to the falling edge of the first control signal a is a moment at which the first control signal a changes from a high level to a low level, that is, a moment at which the infrared strobe light 3 changes from the light-filling state to an off state. A moment corresponding to the rising edge of the second control signal b is a moment at which the second control signal b changes from a low level to a high level, that is, a moment at which the white-light strobe light 5 changes from the off state to the light-filling state. The falling edge of the first control signal a coincides with the rising edge of the second control signal b, so that the white-light strobe light 5 can be turned on only when the infrared strobe light 3 is turned off. In this way, the infrared strobe light 3 and the white-light strobe light 5 are precisely controlled to fill light in the staggered manner.

Certainly, in some other examples, the rising edge of the second control signal b may also lag behind the falling edge of the second control signal a, so that the white-light strobe light 5 can be turned on only after the infrared strobe light 3 is turned off.

Because infrared light is invisible light, light-filling time and a light-filling frequency of the infrared strobe light 3 have no impact on human eyes. To reduce power consumed by the infrared strobe light 3, the infrared strobe light 3 only needs to fill light when the infrared sensor 1 is exposed. Because on and off of the infrared strobe light 3 are controlled by using the first control signal a, the light-filling time of the infrared strobe light 3 may be controlled by controlling a duty cycle of the first control signal a.

Figure 7:
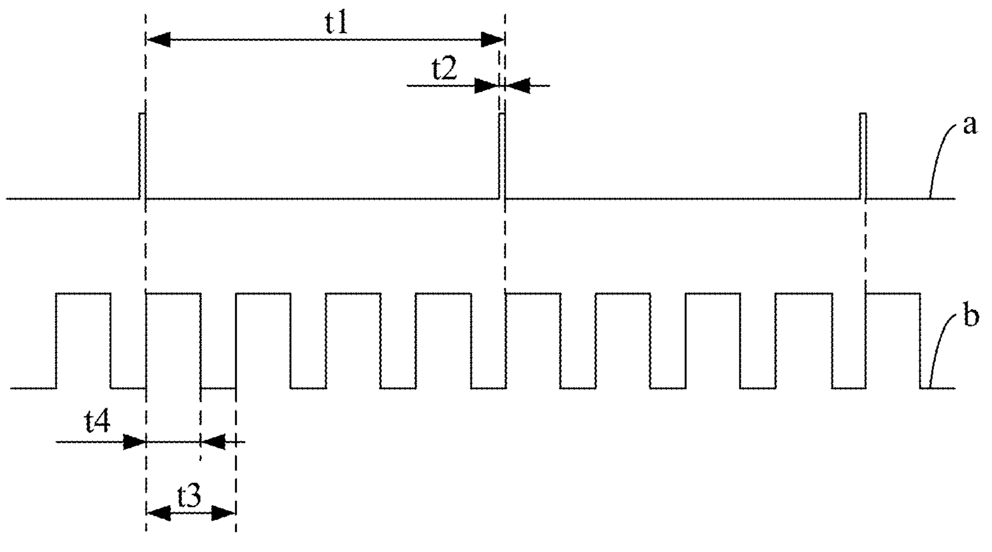
FIG. 7 is a schematic diagram of a signal of a camera module according to an embodiment of the present disclosure.

In some examples, the duty cycle of the first control signal a ranges from 5% to 10%. For example, the duty cycle of the first control signal a may be 8%. The duty cycle of the first control signal a represents, in one pulse cycle, a ratio of time in which the first control signal a is in the high-level state to total time. As shown in FIG. 7, the duty cycle of the first control signal a is t2/t1.

In one pulse cycle, a ratio of power-on time (light-filling time) of the infrared strobe light 3 to the total time is the same as the duty cycle of the first control signal a. In other words, a duty cycle of the infrared strobe light 3 also ranges from 5% to 10%.

Because white light is visible light, the white-light strobe light 5 cannot fill light only when the color sensor 2 is exposed. Otherwise, human eyes are irritated. Meanwhile, power-on time of the white-light strobe light 5 further needs to be reduced. Because on of the white-light strobe light 5 is controlled by using the second control signal b, the duty cycle of the second control signal b is set so that the power-on time of the white-light strobe light 5 can be controlled.

In some examples, the duty cycle of the second control signal b is 60% to 70%. For example, the duty cycle of the second control signal b may be 60%. The duty cycle of the second control signal b represents, in one pulse cycle, a ratio of time in which the second control signal b is in the high-level state to total time. As shown in FIG. 7, the duty cycle of the second control signal b is t4/t3.

In one pulse cycle, a ratio of power-on time (light-filling time) of the white-light strobe light 5 to the total time is the same as the duty cycle of the second control signal b. In other words, a duty cycle of the white-light strobe light 5 also ranges from 60% to 70%. In this way, the white-light strobe light 5 can reduce by power consumption of 30% to 40%. In addition, after the duty cycle of the white-light strobe light 5 is reduced to 60% to 70%, the white light is soft in subjective vision, thereby reducing the irritation for human eyes.

A sum of the duty cycle of the first control signal a and the duty cycle of the second control signal b is less than or equal to 100%, so that the infrared strobe light 3 and the white-light strobe light 5 are asynchronously in the light-filling state.

In some examples, to reduce impact of cyclic light filling of the white-light strobe light 5 on human eyes, a frequency of the second control signal b ranges from 80 Hz to 100 Hz. For example, the frequency of the second control signal b may be 100 Hz.

When light is dark, the infrared strobe light 3 needs to fill light when the infrared sensor 1 is exposed, and the white-light strobe light 5 needs to fill light when the color sensor 2 is exposed. Therefore, to allow the infrared strobe light 3 and the white-light strobe light 5 to fill light in the staggered manner, the infrared sensor 1 and the color sensor 2 also need to be set to be exposed in the staggered manner. An implementation example in which the infrared sensor 1 and the color sensor 2 are exposed in the staggered manner is described below.

In some examples, as shown in FIG. 3, the infrared sensor 1 is further configured to generate a frame synchronization signal c, and generate the first control signal a based on the frame synchronization signal c; and also transmits the frame synchronization signal c to the color sensor 2. The first control signal a is further configured for controlling exposure of the infrared sensor 1. The infrared sensor 1 is exposed when the first control signal a is in the high-level state. The color sensor 2 is configured to receive the frame synchronization signal c, and generate a third control signal d based on the frame synchronization signal c. The third control signal d is configured for controlling exposure of the color sensor 2. The color sensor 2 is exposed when the third control signal d is in the high-level state. The third control signal d and the first control signal a are asynchronously in the high-level state.

The frame synchronization signal c may also be referred to as an FSIN signal. The frame synchronization signal can be configured for precisely controlling exposure of the infrared sensor 1 and the color sensor 2 in the staggered manner.

The frame synchronization signal c is only used as a reference for exposure of the infrared sensor 1 and the color sensor 2 in the staggered manner, and does not actually control exposure of the infrared sensor 1 and the color sensor 2. Therefore, the frame synchronization signal c may be transmitted by the infrared sensor 1 to the color sensor 2, or may be transmitted by the color sensor 2 to the infrared sensor 1.

In some other examples, as shown in FIG. 4, the color sensor 2 is also configured to generate a frame synchronization signal c, and generate the third control signal d based on the frame synchronization signal c; and also transmits the frame synchronization signal c to the infrared sensor 1. The third control signal d is configured for controlling exposure of the color sensor 2. The color sensor 2 is exposed when the third control signal d is in the high-level state. The infrared sensor 1 is configured to receive the frame synchronization signal c, and generate the first control signal a based on the frame synchronization signal c. The first control signal a is further configured for controlling exposure of the infrared sensor 1. The infrared sensor 1 is exposed when the first control signal a is in the high-level state. The third control signal d and the first control signal a are asynchronously in the high-level state.

The infrared sensor 1 and the color sensor 2 use the frame synchronization signal c as the same reference. In this way, the infrared sensor 1 and the color sensor 2 can be precisely controlled to be exposed in the staggered manner.

As shown in FIG. 6, a register in the infrared sensor 1 sets, by using a high level of the current frame synchronization signal c as a reference, that the high level of the first control signal a lags behind a high level of the frame synchronization signal c. A register in the color sensor 2 may set, by using the high level of the current frame synchronization signal c as a reference, that a high level of the third control signal d lags behind the high level of the frame synchronization signal c. In addition, lagged time of the third control signal d is longer than lagged time of the first control signal a, so that the infrared sensor 1 is exposed before the color sensor 2 is exposed. The high level of the first control signal a may alternatively lag behind the high level of the frame synchronization signal c, and the high level of the frame synchronization signal c lags behind the high level of the third control signal d (e.g., a first strobe in the first control signal a for capturing a current infrared frame is generated according to a current strobe in the frame synchronization signal c, a second strobe in the third control signal d for capturing a current color frame associated with the current infrared frame is generated with a delay according to a previous strobe in the frame synchronization signal c, the previous strobe in the frame synchronization signal c is before the current strobe in the frame synchronization signal c, thus the second strobe in the third control signal d can be generated before the current strobe in the frame synchronization signal c).

In some examples, as shown in FIG. 5, the current of the infrared strobe light 3 in the light-filling state is greater than the current of the white-light strobe light 5 in the light-filling state, in other words, m>n.

For example, the current of the white-light strobe light 5 in the light-filling state is 20 mA.

In some examples, eight to twelve infrared strobe lights 3 are provided, and eight to twelve white-light strobe lights 5 are provided.

The reduced peak current and power in the camera module provided in this embodiment of the present disclosure are calculated below.

Because the current of the infrared strobe light 3 in the light-filling state is greater than the current of the white-light strobe light 5 in the light-filling state, a reduced value of the peak current of the strobe lights in the camera module is a current value of the white-light strobe light 5 in the light-filling state. It is assumed that twelve white-light strobe lights 5 are provided, a power supply voltage is 5 V, power supply efficiency is 85%, a conduction voltage of the white-light strobe lights 5 is 3 V, and a conduction current of the white-light strobe lights 5 is 20 mA. In this case, the reduced peak current is: 20 mA×12 pcs×3 V/(5 V×85%)=169.5 mA. Assuming that the duty cycle of the second control signal is 60%, the power reduced by the twelve white-light strobe lights 5 is that 20 mA×12 pcs×3 V×40%/85%=339 mW.

An embodiment of the present disclosure further provides an interaction device. The interaction device includes the foregoing camera module.

The interaction device may be a device configured to recognize information, such as a payment device or an identity recognition device.

When a user needs to recognize information by using the interaction device, if an environment is dark, a controller of the interaction device may control an infrared sensor 1 in the camera module to transmit a first control signal a to an infrared strobe light, and control an image processor 4 to transmit a second control signal b to a white-light strobe light 5, so that the interaction device can obtain a clear image, thereby quickly recognizing the information. Because a peak current of the strobe lights in the camera module is small, the camera module can be integrated even if a power supply capability of the interaction device is weak.

In addition, because the peak current of the strobe lights is small, the interaction device has good electro magnetic compatibility (EMC) performance. In addition, because the interaction device does not need to have a high power supply capability, material costs of the interaction device may be reduced.

The foregoing descriptions are merely some embodiments of the present disclosure, but are not intended to limit the present disclosure. Any modification, equivalent replacement, and improvement made without departing from the principle of the present disclosure shall fall within the protection scope of the present disclosure.

What is claimed is:

1. A camera module, comprising:

an infrared sensor configured to capture infrared light according to a first control signal having first strobes;

a color sensor configured to capture white light according to a third control signal having second strobes;

an infrared light source configured to provide supplemental infrared light according to the first control signal, the infrared light source being turned on or off according to the first control signal;

a white-light light source configured to provide supplemental white-light according to a second control signal that is a pulse width modulation (PWM) signal, the white-light light source being turned on or off according to the second control signal; and a control circuit configured to generate the second control signal with at least a first rising edge of a first pulse being synchronized with a first falling edge of a first strobe of the first strobes in the first control signal, the second control signal causing the white-light light source to turn on in response to the first rising edge when the infrared light source is turned off based on the first falling edge of the first strobe.

2. The camera module according to claim 1, wherein:

the infrared sensor is configured to output the first control signal to the infrared light source and the control circuit;

the infrared sensor and the infrared light source are synchronized based on the first control signal; and the control circuit is configured to generate the second control signal based on the first control signal, at least the first rising edge of the first pulse being synchronized with the first falling edge of the first strobe in the first control signal.

3. The camera module according to claim 2, wherein the first control signal has a duty cycle in a range from 5% to 10%.

4. The camera module according to claim 2, wherein the second control signal has a duty cycle in a range from 60% to 70%.

5. The camera module according to claim 2, wherein the second control signal has a frequency in a range from 80 Hz to 100 Hz.

6. The camera module according to claim 2, wherein:

the infrared sensor is configured to generate a frame synchronization signal and provide the frame synchronization signal to the color sensor; and the color sensor is configured to generate the third control signal based on the frame synchronization signal.

7. The camera module according to claim 6, wherein:

the infrared sensor is configured to capture the infrared light of a current infrared frame according to a first synchronization strobe in the frame synchronization signal; and the color sensor is configured to capture the white light of a current color frame associated with the current infrared frame according to a second synchronization strobe in the frame synchronization signal, the second synchronization strobe being a previous synchronization strobe of the first synchronization strobe.

8. The camera module according to claim 6, wherein:

the infrared sensor is configured to capture the infrared light of a current infrared frame according to a first synchronization strobe in the frame synchronization signal; and the color sensor is configured to capture the white light of a current color frame associated with the current infrared frame according to the first synchronization strobe in the frame synchronization signal.

9. The camera module according to claim 2, wherein:

the second control signal has a higher frequency than the first control signal.

10. The camera module according to claim 2, wherein:

the color sensor is configured to generate a frame synchronization signal, generate the third control signal based on the frame synchronization signal, and provide the frame synchronization signal to the infrared sensor; and the infrared sensor is configured to generate the first control signal based on the frame synchronization signal.

11. The camera module according to claim 2, wherein a first current of the infrared light source when the infrared light source is turned on is greater than a second current of the white-light light source when the white-light light source is turned on.

12. A method of imaging, comprising:

turning on/off an infrared light source according to a first control signal having first strobes, the infrared light source providing supplemental infrared light when the infrared light source is turned on;

turning on/off a white-light light source according to a second control signal that is a pulse width modulation (PWM) signal, the white-light light source providing supplemental white light when the white-light light source is turned on;

controlling an infrared sensor according to the first control signal, the infrared sensor capturing infrared light according to the first strobes in the first control signal and being synchronized with the infrared light source according to the first control signal;

controlling a color sensor according to a third control signal having second strobes, the color sensor capturing white light according to the second strobes in the third control signal; and generating the second control signal with at least a first rising edge of a first pulse being synchronized with a first falling edge of a first strobe of the first strobes in the first control signal, the second control signal causing the white-light light source to turn on in response to the first rising edge when the infrared light source is turned off based on the first falling edge of the first strobe.

13. The method according to claim 12, wherein the first control signal has a duty cycle in a range from 5% to 10%.

14. The method according to claim 12, wherein the second control signal has a duty cycle in a range from 60% to 70%.

15. The method according to claim 12, wherein the second control signal has a frequency in a range from 80 Hz to 100 Hz.

16. The method according to claim 12, further comprising:

generating a frame synchronization signal; and generating the first control signal and the third control signal based on the frame synchronization signal.

17. The method according to claim 16, further comprising:

capturing the infrared light of a current infrared frame according to a first synchronization strobe in the frame synchronization signal; and capturing the white light of a current color frame associated with the current infrared frame according to a second synchronization strobe in the frame synchronization signal, the second synchronization strobe being a previous synchronization strobe of the first synchronization strobe.

18. The method according to claim 16, further comprising:

capturing the infrared light of a current infrared frame according to a first synchronization strobe in the frame synchronization signal; and capturing the white light of a current color frame associated with the current infrared frame according to the first synchronization strobe in the frame synchronization signal.

19. The method according to claim 16, wherein:

the second control signal has a higher frequency than the first control signal.

20. A non-transitory computer-readable storage medium storing instructions which when executed by at least one processor cause the at least one processor to perform:

turning on/off an infrared light source according to a first control signal having first strobes, the infrared light source providing supplemental infrared light when the infrared light source is turned on;

turning on/off a white-light light source according to a second control signal that is a pulse width modulation (PWM) signal, the white-light light source providing supplemental white light when the white-light light source is turned on;

controlling an infrared sensor according to the first control signal, the infrared sensor capturing infrared light according to the first strobes in the first control signal and being synchronized with the infrared light source according to the first control signal;

controlling a color sensor according to a third control signal having second strobes, the color sensor capturing white light according to the second strobes in the third control signal; and generating the second control signal with at least a first rising edge of a first pulse being synchronized with a first falling edge of a first strobe in the first control signal, the second control signal causing the white-light light source to turn on in response to the first rising edge when the infrared light source is turned off based on the first falling edge of the first strobe.

* * * * *